(12) United States Patent
Barry et al.

(10) Patent No.: US 9,045,357 B2
(45) Date of Patent: Jun. 2, 2015

(54) SYSTEM FOR REDUCING CONTAMINANTS FROM A PHOTOELECTROCATALYTIC OXIDIZATION APPARATUS THROUGH POLARITY REVERSAL AND METHOD OF OPERATION

(71) Applicant: AquaMost, Inc., Madison, WI (US)

(72) Inventors: Terence P. Barry, Middleton, WI (US); Craig Doolittle, Monona, WI (US); Alan Carlson, Columbus, WI (US); Douglas S. Winkie, Madison, WI (US)

(73) Assignee: AquaMost, Inc., Madison, WI (US)

( * ) Notice: Subject to any disclaimer, the term of this patent is extended or adjusted under 35 U.S.C. 154(b) by 196 days.

(21) Appl. No.: 13/894,621

(22) Filed: May 15, 2013

(65) Prior Publication Data

US 2013/0270196 A1     Oct. 17, 2013

Related U.S. Application Data

(63) Continuation-in-part of application No. 13/769,741, filed on Feb. 18, 2013, now Pat. No. 8,568,573, which is a continuation of application No. 13/544,721, filed on Jul. 9, 2012, now Pat. No. 8,398,828.

(60) Provisional application No. 61/583,974, filed on Jan. 6, 2012, provisional application No. 61/647,372, filed on May 15, 2012.

(51) Int. Cl.
    *C02F 1/32* (2006.01)
    *C02F 1/467* (2006.01)
    (Continued)

(52) U.S. Cl.
    CPC ............. *C02F 1/32* (2013.01); *C02F 1/4672* (2013.01); *C02F 1/4602* (2013.01);
    (Continued)

(58) Field of Classification Search
    CPC .. C02F 1/4602; C02F 1/46104; C02F 1/4672; C25B 1/003
    USPC ........................................... 204/229.6
    See application file for complete search history.

(56) References Cited

U.S. PATENT DOCUMENTS 2,282,024 A     5/1942   Bitner
4,042,758 A     8/1977   Weinstein et al.
(Continued)

FOREIGN PATENT DOCUMENTS

CA      2632788 A1      11/2009
CN      2558656 Y        6/2002
(Continued)

OTHER PUBLICATIONS

Abeysinghe et al., 1996, Biofilters for Water Reuse in Aquaculture, Water Sci. Technol. 34:253-260.
(Continued)

*Primary Examiner* — Nicholas A Smith
(74) *Attorney, Agent, or Firm* — Boardman & Clark LLP

(57) ABSTRACT

A system and method for removing fouling from a photoelectrocatalytic oxidation assembly is provided. The method includes resetting a first counter, increasing the first counter by a first channel increment value, and determining if the value in the first counter exceeds a value corresponding to the number of channels provided in the assembly. If the first counter does not exceed the number of channels, the polarity in a channel associated with the value in the first counter is reversed, and a first timer is reset. If an amount of time in the first timer does not exceed a first time period, the first timer is increased by a first time increment until the time remaining in the first timer exceeds the first time period and the polarity reversal is terminated, returning to the step of increasing the first counter by a first channel increment value.

20 Claims, 3 Drawing Sheets

(51) Int. Cl.
*C02F 1/46* (2006.01)
*C02F 1/461* (2006.01)
*C25B 1/00* (2006.01)
*C02F 1/00* (2006.01)
*C02F 1/72* (2006.01)

(52) U.S. Cl.
CPC ............ *C02F 1/46104* (2013.01); *C02F 1/325* (2013.01); *C02F 1/725* (2013.01); *C25B 1/003* (2013.01); *C02F 2001/46142* (2013.01); *C02F 2201/3227* (2013.01); *C02F 2201/4613* (2013.01); *C02F 2201/46135* (2013.01); *C02F 2209/02* (2013.01); *C02F 2209/42* (2013.01); *C02F 2305/10* (2013.01); *C02F 1/008* (2013.01); *C02F 2209/006* (2013.01); *C02F 2209/44* (2013.01)

(56) References Cited

U.S. PATENT DOCUMENTS

| | | | |
|---|---|---|---|
| 4,181,593 | A | 1/1980 | McKinzie et al. |
| 4,349,765 | A | 9/1982 | Brandli |
| 4,471,036 | A | 9/1984 | Skotheim |
| 4,521,499 | A | 6/1985 | Switzer |
| 4,592,807 | A | 6/1986 | Switzer |
| 4,793,910 | A | 12/1988 | Smotkin et al. |
| 4,908,109 | A | 3/1990 | Wright |
| 5,022,970 | A | 6/1991 | Cook |
| 5,035,784 | A | 7/1991 | Anderson |
| 5,137,607 | A | 8/1992 | Anderson et al. |
| 5,215,943 | A | 6/1993 | Anderson et al. |
| 5,227,342 | A | 7/1993 | Anderson |
| 5,308,454 | A | 5/1994 | Anderson et al. |
| 5,395,522 | A | 3/1995 | Melanson et al. |
| 5,439,624 | A | 8/1995 | Anderson |
| 5,449,466 | A | 9/1995 | Peebles et al. |
| 5,543,034 | A | 8/1996 | Hilbertz |
| 5,603,843 | A | 2/1997 | Snee |
| 5,616,152 | A | 4/1997 | Velasquez |
| 5,622,791 | A | 4/1997 | Shackle |
| 5,712,037 | A | 1/1998 | Anderson |
| 5,736,023 | A | 4/1998 | Gallagher et al. |
| 5,846,390 | A | 12/1998 | Eki et al. |
| 5,858,199 | A | 1/1999 | Hanak |
| 5,932,111 | A | 8/1999 | Christensen et al. |
| 5,963,417 | A | 10/1999 | Anderson et al. |
| 6,074,072 | A | 6/2000 | Parsons |
| 6,136,186 | A | 10/2000 | Gonzalez-Martin et al. |
| 6,159,421 | A | 12/2000 | Fujii |
| 6,180,014 | B1 | 1/2001 | Salama |
| 6,218,035 | B1 | 4/2001 | Fuglevand et al. |
| 6,261,464 | B1 | 7/2001 | Herrington et al. |
| 6,379,560 | B1 | 4/2002 | Tilp |
| 6,409,893 | B1 | 6/2002 | Holzbock |
| 6,409,928 | B1 | 6/2002 | Gonzalez et al. |
| 6,524,447 | B1 | 2/2003 | Carmignani et al. |
| 6,547,951 | B1 | 4/2003 | Maekawa |
| 6,645,366 | B2 | 11/2003 | Iseki et al. |
| 7,008,473 | B2 | 3/2006 | Butters |
| 7,230,255 | B2 | 6/2007 | Shim |
| 7,326,330 | B2 | 2/2008 | Herrington et al. |
| 7,425,272 | B2 | 9/2008 | Butters et al. |
| 7,862,700 | B2 | 1/2011 | Wilkins et al. |
| 8,398,828 | B1 | 3/2013 | Winkie |
| 2001/0004962 | A1 | 6/2001 | Hirota et al. |
| 2001/0042682 | A1 | 11/2001 | Weres et al. |
| 2002/0037240 | A1 | 3/2002 | Okada et al. |
| 2002/0185080 | A1 | 12/2002 | Ortiz |
| 2003/0066750 | A1 | 4/2003 | Wu |
| 2004/0020861 | A1 | 2/2004 | Lehmann et al. |
| 2004/0022700 | A1 | 2/2004 | Kim et al. |
| 2005/0014066 | A1 | 1/2005 | Shimamune |
| 2005/0051439 | A1 | 3/2005 | Jang |
| 2005/0249659 | A1 | 11/2005 | Flynn et al. |
| 2006/0060787 | A1 | 3/2006 | Herrington et al. |
| 2006/0123885 | A1 | 6/2006 | Yates et al. |
| 2006/0144700 | A1 | 7/2006 | Carson et al. |
| 2007/0020158 | A1 | 1/2007 | Hashimoto et al. |
| 2007/0108056 | A1 | 5/2007 | Nyberg et al. |
| 2007/0131621 | A1 | 6/2007 | Denton |
| 2007/0205097 | A1 | 9/2007 | Schaefer |
| 2007/0251811 | A1 | 11/2007 | Sahle-Demessie et al. |
| 2007/0272877 | A1 | 11/2007 | Tribelsky et al. |
| 2008/0050471 | A1 | 2/2008 | Omasa |
| 2008/0121531 | A1 | 5/2008 | Anderson et al. |
| 2008/0156658 | A1 | 7/2008 | Herrington et al. |
| 2008/0170971 | A1 | 7/2008 | Bergeron et al. |
| 2008/0220535 | A1 | 9/2008 | LeBoeuf et al. |
| 2008/0259338 | A1 | 10/2008 | Sanchez et al. |
| 2009/0130748 | A1 | 5/2009 | Uphoff |
| 2009/0154060 | A1 | 6/2009 | Anderson et al. |
| 2009/0281480 | A1 | 11/2009 | Orlebeke et al. |
| 2009/0314711 | A1 | 12/2009 | Barry et al. |
| 2009/0320894 | A1 | 12/2009 | Angluli et al. |
| 2010/0187122 | A1* | 7/2010 | Zolotarsky et al. ........... 205/334 |
| 2010/0201239 | A1 | 8/2010 | Mostoller et al. |
| 2010/0209294 | A1 | 8/2010 | Owen et al. |
| 2010/0270167 | A1 | 10/2010 | McFarland |
| 2010/0294726 | A1 | 11/2010 | Butters et al. |
| 2010/0326833 | A1 | 12/2010 | Messalem et al. |
| 2011/0114506 | A1 | 5/2011 | Fletcher |
| 2011/0180423 | A1 | 7/2011 | Barry et al. |
| 2012/0031852 | A1 | 2/2012 | Aglietto |

FOREIGN PATENT DOCUMENTS

| | | |
|---|---|---|
| CN | 1538939 A | 8/2002 |
| CN | 201031159 Y | 3/2007 |
| CN | 101033105 A | 9/2007 |
| CN | 101172674 A | 10/2007 |
| CN | 100558652 C | 11/2007 |
| CN | 101219371 A | 7/2008 |
| CN | 101543771 A | 9/2009 |
| CN | 101584996 A | 11/2009 |
| CN | 101913678 A | 8/2010 |
| CN | 101863548 A | 10/2010 |
| DE | 19602947 A1 | 1/1996 |
| EP | 2394963 A1 | 12/2011 |
| JP | 7-39273 | 2/1995 |
| JP | 2000-201569 A | 7/2000 |
| JP | 2000-210570 A | 8/2000 |
| JP | 2001-29747 A | 2/2001 |
| JP | 2001-62469 A | 3/2001 |
| JP | 2001-136862 A | 5/2001 |
| JP | 2001-170204 A | 6/2001 |
| JP | 2002-59177 A | 2/2002 |
| JP | 2003-190777 A | 7/2003 |
| JP | 2003-200043 A | 7/2003 |
| JP | 2003-200178 A | 7/2003 |
| JP | 2004-154742 A | 6/2004 |
| JP | 2005-152815 A | 6/2005 |
| JP | 2005-193216 A | 7/2005 |
| JP | 2006-61886 A | 3/2006 |
| JP | 2006-230345 | 9/2006 |
| JP | 2006-526500 A | 11/2006 |
| JP | 2007-69124 A | 3/2007 |
| JP | 2007-167029 A | 7/2007 |
| JP | 2011-55795 A | 3/2011 |
| KR | 10-2010-0003902 | 1/2010 |
| KR | 20-2011-0010953 | 11/2011 |
| WO | WO 2006/027659 | 3/2006 |

OTHER PUBLICATIONS

Asadi et al., 2006, Degradation of Aqueous Methyl tert-Butyl Ether by Photochemical, Biological, and Their Combined Processes, Int'l. Journal of Photoenergy, 2006: 1-7.

Baram et al., 2009, Enhanced inactivation of *E. coli* bacteria using immobilized porous TiO2 photoelectrocatalysis, Electrochimica Acta 54 (2009) 3381-3386.

Barreto et al., 1995, Photocatalytic Degradation of Methyl-tert-Butyl Ether in TiO2 Slurries: A Proposed Reaction Scheme, Wat. Res. vol. 29, No. 5, pp. 1243-1248.

(56) References Cited

OTHER PUBLICATIONS

Bradley et al., 1999, Aerobic Mineralization of MTBE and tert-Butyl Alcohol by Stream-Bed Sediment Microorganisms, Environ. Sci. Technol. 33:1877-1879.
Candal et al., 1998, TiO2-Mediated Photoelectrocatalytic Purification of Water, J. Adv. Oxid. Technol. vol. 3, No. 3, pp. 270-276.
Candal et al., 1999, Titanium-Supported Titania Photoelectrodes Made by Sol-Gel Processes, J. of Env. Engin., October, pp. 906-912.
Candal et al., 2000, Effects of pH & Applied Pot. on Photocurrent and Oxid. Rate of Saline Solna. of Formic Acid in a Photoelectrocat. Reactor, Env. Sci. Tech. 34:3443-3451.
Cater et al., 2000, UV/H2O2 Treatment of Methyl tert-Butyl Ether in Contaminated Waters, Environ. Sci. Technol. 34: 659-662.
Chang et al., 2000, Kinetics of Methyl Tert-Butyl Ether Degradation & By-Product Formation During UV/Hydrogen Peroxide Water Treatment, Water Res. vol. 34, No. 8,p. 2223-2340.
Chen, 2004, Electrochemical Technologies in Wastewater Treatment, Sep. Purif. Technol. 38:11-41.
Cheng et al., 2007, Models of Hypochlorite production in electrochemical reactors with plate and porous anodes, J Appl Electrochem 37:1203-1217.
Chiang et al., 1996, Photodegradation of Chlorinated Organic Wastes with n-TiO2 Promoted by P-CuO , Journal of the Chinese Chemical Society, 43: 21-27.
Chiang et al., 1995, Indirect Oxidation Effects in Electrochemical Oxidation Treatment of Landfill Leachate, Water Res. 29:671-678.
Cho et al., 2008, Meas. of OH radical CT for inactivating *Cryptosporidium parvum* using photo/ferrioxalate and photo/TiO2 systems, Jrnl. of Applied Microbiology, 104: 759-766.
Cho et al., 2010, Mechanisms of *Escherichia coli* inactivation by several disinfectants, Water Research 44: 3410-3418.
Christensen et al., 2003, Photoelectrocatalytic and photocatalytic disinfection of *E. coli* suspensions by titanium dioxide, Applied Catalysis B: Environmental 41: 371-386.
Church et al., 1997, Method for Determination of Methyl tert-Butyl Ether and Its Degradation Products in Water, Environmental Science & Technology, 31: 3723-3726.
Chu et al., 2004, The photocatalytic degradation of dicamba in TiO2 suspensions with the help of hyd. perox. by different near UV irradiations, Water Research 38:1037-1043.
Clancy et al., 2000, Using UV to Inactivate *Cryptosporidium*, American Water Works Association Journal; Sep., pp. 97-104, 107.
Cooper et al., 1994, Process Options for Phosphorus and Nitrogen Removal from Wastewater, J. Inst. Water Envrion. Manag. 8:84-92.
Crittenden et al., 1996, Solar detoxification of fuel-contaminated groundwater using fixed-bed photocatalysts, Water Environment Resesrch, vol. 68, No. 3, pp. 270-278.
Czarnetzki, et al., 1992, Formation of Hypochlorite, Chlorate, and Oxygen During NaCl Electrolysis from Alkaline-Solutions at a RuO2/TiO2 Anode, J. Appl. Electro. 22:315-324.
Davis et al., 2000, Alternative Sorbents for Removing MTBE from Gasoline-Contaminated Groundwater, J. Environ. Eng., 126: 354.
Delos Reyes, et al., 1996, Combination of a Bead Filter and Rotating Biological Contactor in a Recirculating Fish Culture System, Aquacultural Engineering vol. 15, pp. 27-39.
Dunlop et al., 2008, Photocatalytic inactivation of *Clostridium perfringens* spores on TiO2 electrodes, Journal of Photochemistry and Photobiology A: Chemistry 196: 113-119.
Egerton et al., 2006, Photoelectrocatalysis by titanium dioxide for water treatment, Int. J. Environment and Pollution, vol. 27, Nos. 1/2/3, pp. 2-19.
Eslami et al., 2008, Photocatalytic Degradation of methyl tert-butyl ether (MTBE) in Contaminated Water by ZnO Nanoparticles, J Chem Technol Biotechnol 83:1447-1453.
Fraga et al., 2009, Evaluation of the photoelectrocatalytic method for oxidi. chl. & simult. removal of microcystin toxins in surface waters, Electrochimica Acta 54:2069-2076.
Fujishima et al., 1998, Interfacial photochemistry: Fundamentals and applications, Pure & Appl. Chem.,vol. 70, No. 11, pp. 2177-2187.

Garrett et al., 1986, MTBE as Grd. Water Contam., Procds. of MWWA/API Conf. on Petro. Hydrocarb. & Org. Chem. in Grd. Water, Hou. Tex. Nov. 12-14, Dublin, OH, NWWA, p. 227-238.
Gerischer, 1993,Photoelectrochemical Catalysis of the Oxidation of Organic Mol. by Oxygen on Small Semiconductor Particles with TiO2 as an Example, Electrochimica Acta, 38:3-9.
Gupta et al., 1995, Toxicity of Methyl Tertiary Butyl Ether to *Daphnia Magna* and *Photobacterium phosphoreum*, Bull. Environ. Contam. Toxicol., 55:618-620.
Helmer et al., 1998, Simultaneous Nitrification/Dentrification in an Anerobic Biofilm System, Wat. Sci. Tech., vol. 37. No. 4-5. pp. 183-187.
Hoffman et al., 1994, Photocatalytic Production of H2O2 and Organic Peroxide on Quantum-Sized Semiconductor Colloids, Environ. Sci. Technol. 28: 776-785.
Hoffman et al., 1995, Environmental Applications of Semiconductor Photocatalysis, Chem. Rev. 1995, 95, pp. 69-96.
Ip et al., 2001, Ammonia Toxicity, Tolerance, and Excretion, Fish Physiology, vol. 20: Nitrogen Excretion, pp. 109-148.
Johnson et al., 2000, MTBE to What Extent Will Past Releases Contaminate Community Water Supply Wells?, Environmental Science & Technology, May 1, 2000, pp. 2-9.
Kaneko et al., 2006, Photoelectrochemical reaction of biomass & bio-related compounds w/ nanoporous TiO2 film photoanode and O2-reducing cathode, Electrochem. Comm. 8:336-340.
Keller, et al., 1998, An integral cost-benefit analysis of gaso. form. mtg. Cali. Phase II Reformulated Gaso. requirements, Cost-Benefit Analysis of Gaso. Formu., pp. 1-56.
Kim et al., 1994, Photoelectrocatalytic Degradation of Formic Acid Using a Porous Ti02 Thin-Film Electrode, Environ. Sci. Technol. 1994, 28:479-483.
Kim et al., 1995, Effects of Firing Temperature on Photocatalytic and Photoelectrocatalytic Properties of Ti02, J. Environ. Engin., Aug. 1995, pp. 590-594.
Knudson, 1985, Photoreactivation of UV-Irradiated *Legionella pneumophila* and Other *Legionella* Species, Applied and Environmental Microbiology, vol. 49, No. 4, p. 975-980.
Kropp et al., 2009, A device that converts aqueous ammonia into nitrogen gas, Aquacultural Engineering 41 (2009) pp. 28-34.
Lee et al., 2002, Residual Chlorine Distribution and Disinfection during Electrochemical Removal of Dilute Ammonia from an Aqueous Solution, J. Chem. Eng. Japan, 35:285-289.
Li et al., 2005, Photoelectrocatalytic degradation of bisphenol A in aqueous solution using a Au—TiO2/ITO film, Journal of Applied Electrochemistry (2005) 35:741-750.
Liang, et al., 1999, Oxidation of MTBE by Ozone and Peroxone Processes, J. Am. Water Works Assoc. vol. 91, Issue 6, pp. 104-114.
Lin, et al., 1996, Photodegradation of Aroclor 1254 Using Simulated Sunlight and Various Sensitizers, Bull. Environ. Contam. Toxicol. (1996) 56:566-570.
Lin, et al., 1997, Electrochemical Nitrite and Ammonia Oxidation in Sea Water, J. Environ. Sci. Health, A32(8), 2125-2138.
Lin, et al., 1996, Electrochemical Removal of Nitrite and Ammonia for Aquaculture, Wat. Res. vol. 30, pp. 715-721.
Long et al., 2004, A comparison of the survival of F+RNA and F+DNA coli phages in lake water microcosms, J. Water and Health, vol. 2, Issue: 1, Mar. 2004, pp. 15-22.
Malone et al., 2000, Use of Floating Bed Filters to Recondition Recirculating Waters in Warm Water Aquaculture Product Systems, Aquacul. Eng. 22:57-73.
Mamane et al., 2007, Inactivation of *E. coli, B. subtilis* spores, and MS2, T4, and T7 phage using UV/H2O2 advanced oxidation, Journal of Hazardous Materials 146 (2007) 479-486.
Matthews, 1988, An Adsorption Water Purifies with in Situ Photocatalytic Regeneration, Journal of Catalysis 113: 549-555.
Matthews, 1988, Kinetics of Photocatalytic Oxidation of Organic Solutes over Titanium Dioxide, Journal of Catalysis 111: 264-272.
Matthews, 1986, Photo-Oxidation of Organic Material in Aqueous Suspensions of Titanium Dioxide, Wat. Res. vol. 20, No. 5, pp. 569-578.
McClure et al., 2000, A big advance in cleaning up small MTBE levels, Environmental Protection, May 2000, pp. 20, 22-25.

(56) References Cited

OTHER PUBLICATIONS

Mofidi et al., 2002,The effect of UV light on the inactivation of *Giardia lamblia* & *Giardia muris* cysts as determined by animal infectivity assay, Water Research 36:2098-2108.

Ollis et al., 1991, Destruction of Water Contaminants, Environ. Sci. Technol., vol. 25, No. 9, 1991, pp. 1522-1529.

Pavasupree et al., 2006, Structural, Photocatalytic Activity & Photovoltaic Prop. of Mesoporous Anatase Titania Nanopowders Prep. by Hydrothermal Method, Nov. 21-23 Thailand.

Pereira et al., 2008, Comparing Efficacy of Cl., ClO2, & O3 in Inactivation of *Cryptosporidium parvumin* Water from Parana State, S. Brazil, Appl Biochem Biotechnol 151:464-473.

Randall, et al., 2002, Ammonia Toxicity in Fish, Marine Pollution Bulletin 45:17-23.

Rice et al., 1999, Chlorine Inactivation of *Escherichia coli* O157:H7, Emerging Infectious Diseases, vol. 5, No. 3., May-Jun. 1999, pp. 461-463.

Russo et al., 1991, Toxicity of Ammonia, Nitrite, and Nitrate to Fishes, Aquaculture and Water Quality, pp. 58-89.

Sakulkhaemaruethai et al., 2005, Photocatalytic activity of titania nanocrystals prep. by surfactant-assisted templating method . . . , Materials Letters 59: 2965-2968.

Selcuk et al., 2005, Effect of pH, charge separation and ox. concentration in photoelectro. systems: active chlorine production & chlorate formation, Deslination, 176:219-227.

Selli et al., 2005, Degradation of methyl tert-butyl ether in water: effects of the combined use of sonolysis and photocatalysis, Ultrasonics Sonochemistry 12 (2005) 395-400.

Shang et al., 2007,MS2 Coliphage Inactivation with UV Irradiation and Free Chlorine/Monochloramine, Environmental Engineering Science, vol. 24, No. 9, pp. 1321-1332.

Squillace et al., 1996, Environmental Behavior and Fate of Methyl tert-Butyl Ether (MTBE), U.S. Geological Survey-NAWQA, pp. 1-6.

Stefan et al., 2000, Degradation Pathways during the Treatment of Methyl tert-Butyl Ether by the UV/H2O2 Process, Environ. Sci. Technol. 2000, 34:650-658.

Sun et al.,1998, Kinetics & Mechanism of Photoelect. Oxid. Nitrite Ion by Using Rutile Form TiO2/Ti Photoele. w/ High Electric Field Enhan., Ind. Eng. Chem. Res. 37:4207-4214.

Thompson et al., 2003, Detection of Infectious Human Adenoviruses in Tertiary-Treated and Ultraviolet-Disinfected Wastewater, Water Environment Research, 75:163-170.

Tomasso, 1994, Toxicity of Nitrogeneous Wastes to Aquaculture Animals, Reviews in Fisheries Science, 2(4): 291-314.

USEPA, Dec. 1997, Drinking Water Advisory: Consumer Acceptability Advice and Health Effects Analysis on Methyl Tertiary-Butyl Ether (MtBE), EPA-822-F-97-OO9, pp. 1-42.

USEPA, Jun. 2003, Ultraviolet Disinfection Guidance Manual, EPA-815-D-03-007, pp. 1-556.

USEPA, 2008, Rules Part 141—National Primary Drinking Water Regulations.

Van Rijn J, 1996, The Potential for Integrated Biological Treatment Systems in Recirculating Fish Culture—A Review, Aquaculture 139 (1996) 181-201.

Venkatesan et al., 2008, Isolation & Detection Indicator MS2 Coliphage different environ. & sea goods by PEG Precip. & GAC-UAPB-RT-PCR Meth, Adv. Biotech, Jul. 2008, pp. 26-32.

Vinodgopal, et al., 1993, Electrochem. Assist. Photocat. TiO2 Part. Film Elect. for Photocat. Degrad. of 4-Chlorophenol, J. Phys. Chem. 97:9040-9044.

Vinodgopal, et al., 1996, Nano. Semi. Films for Photocat.: Photoelec. Behav. of SnO2/TiO2 Comp. Sys. & its Role in Photocata. Degrad. of Text. Azo Dye, Chem. Mat. 8:2180-2187.

Wilkinson, 1961, A Simple Method for Determining Rate Constants and Orders of Reaction, Chemistry and Industry, pp. 1395-1397.

Wolfe et al., 1989, Inactivation of *Giardia murls* and Indicator Organisms Seeded in Surface Water Supplies by Peroxone and Ozone, Environ. Sci. Technol. 1989, 23:744-745.

Zang et al., 2005, Photocatalytic Decomposition of Methyl Tert-Butyl Ether in Aqueous Slurry of Titanium Dioxide, Applied Catalysis B: Environmental 57 (2005) 275-282.

Zanoni et al., 2004, Photoelectrocatalytic Production of ACtive Chlorine on Nanocrystalline Titanium Dioxide Thin-Film Electrodes, Environ. Sci. Technol. 38:3203-3208.

International Search Report and Written Opinion of the International Searching Authority for PCT/US2013/020308 filed Jan. 4, 2013.

International Search Report and Written Opinion of the International Searching Authority for PCT/US2012/067083 filed Nov. 29, 2012.

Translated Abstract for KR1020040066971 published Jul. 30, 2004, to Kim et al.

Amendment and Response to Office Action dated Nov. 1, 2011 for U.S. Appl. No. 12/369,219.

USPTO Final Office Action dated Nov. 1, 2011 for U.S. Appl. No. 12/369,219.

Amendment and Response to Office Action dated Jun. 16, 2011 for U.S. Appl. No. 12/369,219.

USPTO Nonfinal Office Action dated Jun. 16, 2011 for U.S. Appl. No. 12/369,219.

USPTO Nonfinal Office Action dated Feb. 25, 2013 for U.S. Appl. No. 12/977,347.

Amendment and Response to Office Action dated Feb. 25, 2013 for U.S. Appl. No. 12/977,347.

\* cited by examiner

SYSTEM FOR REDUCING CONTAMINANTS FROM A PHOTOELECTROCATALYTIC OXIDIZATION APPARATUS THROUGH POLARITY REVERSAL AND METHOD OF OPERATION

CROSS REFERENCE TO RELATED APPLICATIONS

This application claims priority to U.S. Provisional Application No. 61/647,372, filed May 15, 2012, and a continuation-in-part of currently U.S. Pat. No. 8,568,573, filed Feb. 18, 2013, which is a continuation of U.S. Pat. No. 8,398,828, filed on Jul. 9, 2012, which claims priority to U.S. Provisional Application No. 61/613,357, filed Mar. 20, 2012 and U.S. Provisional Application No. 61/583,974, filed Jan. 6, 2012, the contents of which is hereby incorporated by reference in its entirety.

FIELD OF THE INVENTION

The present invention relates to the removal of contaminants from aqueous solutions. More specifically, the present invention relates to a system and a method for removing contaminants from a photoelectrocatalytic oxidation apparatus through systematic polarity reversal.

BACKGROUND

Photoelectrocatalytic oxidation, or "PECO," is a process which may be used to treat one or more aqueous solutions to reduce contaminants within the aqueous solutions. Aqueous solutions may include, but are not limited to, hydraulic fracturing fluid, hydraulic fracturing backflow water, high-salinity solutions, groundwater, seawater, wastewater, drinking water, aquaculture (e.g., aquarium water and aquaculture water) and ballast water.

A device implementing PECO may include an electrode assembly having a cathode, an anode, and a light source. In addition, the PECO device may include an electrical bias across the anode and cathode, and/or a pump for providing aqueous solution to the electrode assembly of the PECO device.

During operation of a PECO device to treat one or more aqueous solutions, unwanted material may accumulate on surfaces of PECO device components, including the anode and/or cathode. This undesirable scale or fouling typically impedes or interferes with the function of the component.

Unfortunately, there are a limited number of desirable options available for the removal of scale or fouling from PECO device components. One option is the removal and replacement of the fouled component from the PECO device. However, this option can lead to the addition of unnecessary cost, as the fouled component may be replaced before the completion of its operational life. Further, replacement of fouled components may require the PECO device to be shutdown, leading to undesirable nonoperational time or down time.

Another option is the introduction of a chemical fouling inhibitor. However, the addition of any chemical to the PECO device or associated aqueous solutions is typically undesirable and counterproductive, as the PECO device operates to reduce contaminants from aqueous solutions. The addition of a chemical fouling inhibitor merely adds a potential contaminant to the aqueous solutions the PECO device is treating.

Accordingly, what is needed is a system and method to address PECO device component fouling. More specifically, what is needed is a system and method to address PECO device component fouling during operation of the PECO device, which will maximize the operational life of PECO device components, and which avoids the introduction of chemical fouling inhibitors which may further contaminate aqueous solutions being treated by the PECO device.

SUMMARY OF THE DESCRIPTION

The present invention provides a system and method for the reduction of contaminants which lead to PECO device component fouling. The system and method provides for the systematic reversal of polarity of anode and cathode pairs of a PECO device, leading to a systematic descaling or cleaning of the anode, cathode, and/or associated electrode(s). The system and method also provides for the systematic reversal of polarity of electrode pairs of a PECO device in a manner in which the overall operational efficiency of the PECO device is maximized.

A method for operating a photoelectrocatalytic oxidation assembly for removing fouling from components is provided. The method includes the steps of resetting a first counter, increasing the first counter by a first channel increment value, and determining if the value in the first counter exceeds a value corresponding to the number of channels provided in the photoelectrocatalytic oxidation assembly. If the first counter does not exceed a value corresponding to the number of channels provided in the photoelectrocatalytic oxidation assembly, the following steps are performed: reversing polarity in a channel associated with the value in the first counter, resetting a first timer, determining if an amount of time in the first timer exceeds a first time period, increasing the amount of time remaining in the first timer by a first time increment if the amount of time remaining in the first timer does not exceed the first time period, terminating the polarity reversal in the channel associated with the value in the first counter when the time remaining in the first timer exceeds the first time period, and returning to the step of increasing the first counter by a first channel increment value. If the first counter does exceed a value corresponding to the number of channels provided in the photoelectrocatalytic oxidation assembly, the following step is performed: returning to the step of resetting the first counter.

In addition, a method for removing scale from a plurality of photoelectrodes associated with a photoelectrocatalytic oxidation assembly thru polarity reversal, the plurality of photoelectrodes being associated with a plurality of channels, such that at least one photoelectrode is associated with each channel is also provided. The method includes the steps of resetting a first counter and a first timer, determining if an amount of time in the first timer exceeds a first time period, increasing the amount of time in the first timer by a first time increment, increasing the first counter by a first channel increment value, and determining if the value in the first counter exceeds a value corresponding to the number of channels provided in the photoelectrocatalytic oxidation assembly. In addition, if the first counter does not exceed a value corresponding to the number of channels provided in the photoelectrocatalytic oxidation assembly, the following additional steps are performed: reversing polarity in a channel associated with the value in the first counter, resetting a second timer, determining if an amount of time in the second timer exceeds a second time period, increasing the amount of time remaining in the second timer by a second time increment if the amount of time remaining in the second timer does not exceed the second time period, terminating the polarity reversal in the channel associated with the value in the second counter when the time remaining in the second timer exceeds the second time period and returning to the step of determining if an amount of time in the first timer exceeds the first time period. If the value in the first counter exceeds a value corresponding to the number of channels provided in the photoelectrocatalytic oxidation assembly and the amount of time in the first timer does not exceed the first time period, the additional step of returning to the step of increasing the amount of time in the first timer by a first time increment is performed. If the amount of time in the first timer does exceed the first time period, the step of returning to the step of resetting the first counter and the first timer is performed.

Figure 1:
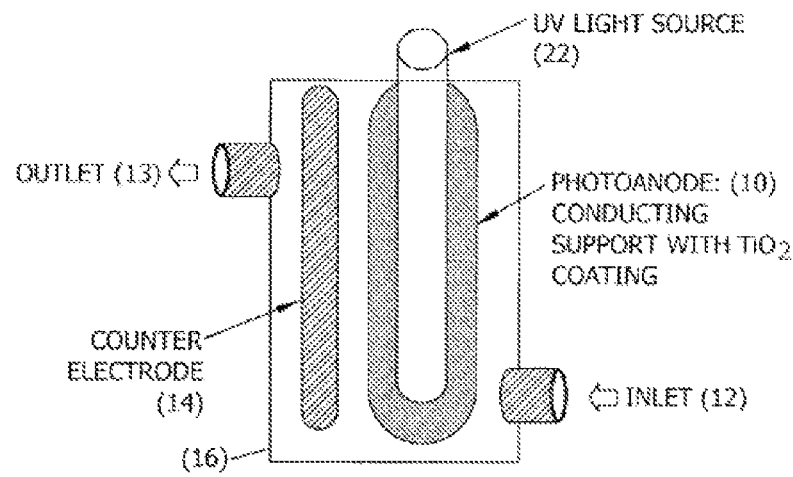
FIG. 1 is a schematic illustration of a first PECO device, which may also be referred to as a photoelectrocatalytic cell, according to one or more examples of embodiments.

While the disclosure is susceptible to various modifications and alternative forms, specific embodiments thereof have been shown by way of example in the drawings and are herein described below in detail. It should be understood, however, that the description of specific embodiments is not intended to limit the disclosure from covering all modifications, equivalents and alternatives falling within the spirit and scope of the disclosure.

DETAILED DESCRIPTION

The invention illustrated in the Figures and disclosed herein is generally directed to a PECO system, and a polarity reversal program 200, 300 for a PECO system and associated method of operation. Unless defined otherwise, all technical and scientific terms used herein have the same meaning as commonly understood by one of ordinary skill in the art to which the disclosure belongs. Although any methods and materials similar to or equivalent to those described herein may be used in the practice or testing of the present disclosure, example methods and materials are described below.

FIG. 1 illustrates one or more examples of embodiments of a photoelectrocatalytic oxidation ("PECO") device. The PECO device may include a photoanode or photoelectrode 10, a cathode or counterelectrode 14, a housing member 16 having an inlet 12 and outlet 13 adapted to house photoelectrode 10 and counterelectrode 14, a light source assembly 22 adapted to emit ultraviolet light (UV) to photoelectrode 10, and an electrical power source (not shown) adapted to apply a voltage across photoelectrode 10 and counterelectrode 14.

In one or more examples of embodiments, photoelectrode 10 may include a conductive support member and a film member. The conductive support member may be constructed from metal. The film member may be nanoporous and include a thin layer (e.g., 200 to 500 nanometers) of a titanium dioxide ($TiO_2$) that is adapted to function as a photocatalyst. The film member may be provided on (e.g., coated on or adhered to) the conductive support member. In various embodiments, the film member may have a median pore diameter in the range of about 0.1 nanometers to 500 nanometers constructed from $TiO_2$ nanoparticles.

In one or more examples of embodiments, photoelectrode 10 may be modified (e.g., to improve performance). Such modifications may include making holes or perforations in the photoelectrode, conductive support member or foil. The holes or perforations may be made at regular intervals, for examples in the range of about 0.5 centimeters to 3.0 centimeters spacing between the holes. Such modifications may also include corrugating or otherwise modifying the photoelectrode, conductive support member or foil to produce a regular wave-like pattern on the foil surface. For example, the height of a corrugation "wave" may be in a range of about 1 millimeter to 5 millimeters. As another example, corrugating the foil twice at right angles to each other may produce a unique cross-hatched pattern on the foil surface.

In one or more examples of embodiments, the $TiO_2$ photocatalyst may be illuminated with light having sufficient near UV energy to generate reactive electrons and holes promoting oxidation of compounds on the anode surface.

Light source assembly 22 may include a lamp or bulb. In addition, light source assembly 22 may include a transparent quartz or fused silica member adapted to house the lamp. In one or more examples of embodiments, the lamp or bulb may be an ultraviolet light having a wavelength in a range of about 200 nanometers to 380 nanometers. In one or more examples of embodiments, the lamp may be a low pressure mercury vapor lamp adapted to emit UV germicidal irradiation at 254 nanometer wavelength. In one or more additional examples of embodiments, the lamp may be adapted to emit an irradiation intensity in the range of 1 to 500 $mW/cm^2$. The irradiation intensity may vary considerably depending on the type of lamp used. Higher intensities may improve the performance of the photoelectrocatalytic oxidation (PECO) device. That optimum irradiation value or intensity may depend, at least in part, upon the distance between the lamp and the photoelectrode.

Various UV light sources, such as germicidal UVC wavelengths (peak at 254 nm) and black-light UVA wavelengths (UVA range of 300-400 nm), may also be utilized in the PECO device. In one or more examples of embodiments, the optimal light wavelength (e.g. for promoting oxidation) is 305 nanometers. However, various near-UV wavelengths are also effective. Both types of lamps may emit radiation at wavelengths that activate photoelectrocatalysis. The germicidal UV and black light lamps are widely available and may be used in commercial applications of the instant PECO device.

In one or more examples of embodiments, the light source assembly may be disposed exterior to the housing member, and the housing member may include a transparent or translucent member adapted to permit ultraviolet light emitted from the light source assembly to irradiate the photoelectrode. In one or more examples of embodiments, the PECO device may also function using sunlight instead of, or in addition to, the light source assembly.

In one or more examples of embodiments, photocatalytic efficiency is improved by applying a potential (i.e., bias) across the photoelectrode and counterelectrode. Applying a potential may decrease the recombination rate of photogenerated electrons and holes. In various embodiments, an effective voltage range applied may be in the range of −1 V to +15 V. In various embodiments, an electrical power source is adapted to apply an electrical potential in the range of 4 V to 12 V across the photoelectrode and counterelectrode. In various embodiments, the electrical power source is adapted to generate an electrical potential in the range of 1.2 V to 3.5 V across the photoelectrode and counterelectrode. In one or more examples of embodiments where the PECO device includes a reference electrode, for example as illustrated in FIG. 2, the electrical power source is adapted to generate an electrical potential in the range of 0 to 2.3 V versus the reference electrode.

Figure 2:
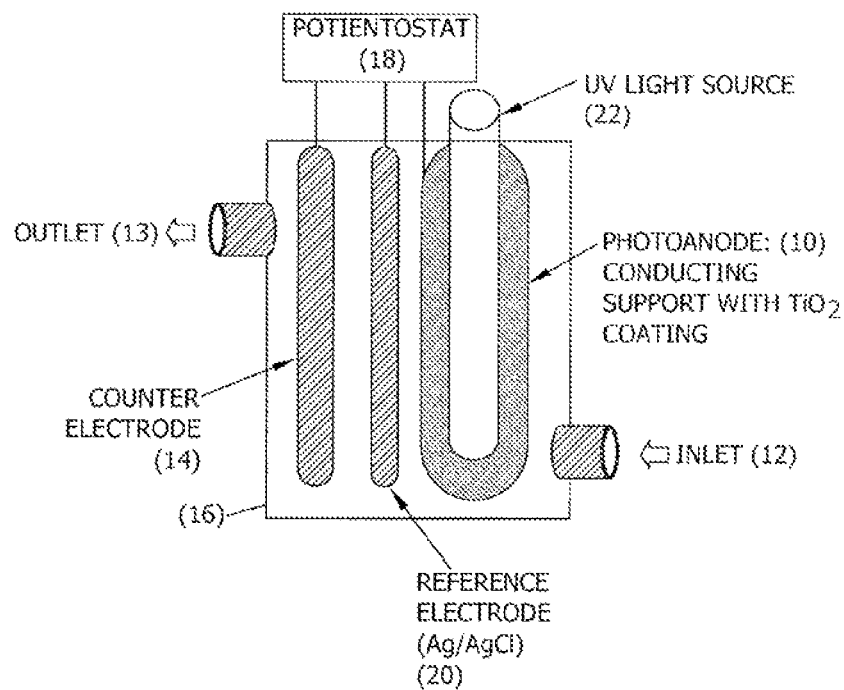
FIG. 2 is a schematic illustration of a second PECO device, which may also be referred to as a photoelectrocatalytic cell, according to one or more examples of embodiments.

Referring now to FIG. 2, in one or more examples of embodiments, the PECO device may additionally include a potentiostat 18, and a reference electrode 20 in electrical communication with the potentiostat 18. In one or more examples of embodiments, the device further includes a reference electrode and a voltage control device, such as a potentiostat, adapted to maintain a constant voltage or constant current between the reference electrode and the photoelectrode. In one or more examples of embodiments, the housing member may be adapted to house the reference electrode.

In one or more examples of embodiments, the PECO device may further include a semi-micro saline bridge member connecting the potentiostat and reference electrode, whereby the housing member may be adapted to house the saline bridge. In one or more examples of embodiments, the reference electrode may be constructed from silver and is in the shape of a wire.

The potential on the photoelectrode 10 may be held constant relative to a saturated calomel reference electrode by potentiostat 18, such as that available from EG&G Model 6310. In one or more examples of embodiments, potentiostat 18 may be connected to the reference electrode through a semi-micro saline bridge, such as available from EG&G, Model K0065. The saline bridge may be disposed inside the reactor close to photoelectrode 10. The current passing through the PECO device may be measured.

Potentiostat 18 may be a variable current source that can measure a voltage between two electrodes. Potentiostat 18 may perform a wide variety of electrochemical functions, but two example functional modes include constant current and constant voltage. In constant current mode, potentiostat 18 may supply a user specified or predetermined current to the electrodes. In constant voltage mode, potentiostat 18 may supply current to the electrodes while monitoring the voltage. Potentiostat 18 may then continually adjust the current such that the voltage will remain constant at a user specified value. Potentiostat 18 may also be configured to supply pulses.

In operation of the PECO device illustrated in FIGS. 1 and 2, an aqueous solution having at least one contaminant, including, but not limited to, an organism, an organic chemical, an inorganic chemical, and/or combinations thereof is introduced to the PECO device. The aqueous solution is subsequently exposed to photoelectrocatalytic oxidization.

In one example of an application of the device described herein, the device uses photoelectrocatalysis as a treatment method for hydraulic fracturing fluid. While typically described herein as reducing or removing contaminants from hydraulic fracturing fluid, it should be understood by one skilled in the art that photoelectrocatalysis of other contaminants can be performed similarly using the photoelectrocatalytic oxidation or PECO device.

Generally, the method for reducing amount of contaminants in solution or fluid described includes introducing the solution into a housing or container or cell including: a UV light; a photoelectrode, wherein the photoelectrode comprises an anatase polymorph of titanium, a rutile polymorph of titanium, or a nanoporous film of titanium dioxide; and a cathode. The photoelectrode is irradiated with UV light, and a first potential is applied to the photoelectrode and counterelectrode for a first period of time. A second potential is applied to the photoelectrode and counterelectrode for a second period of time. As a result, the contaminant amount in solution is reduced.

In various embodiments, one or more contaminants are oxidized by a free radical produced by a photoelectrode, and wherein one or more contaminants are altered electrochemically (e.g., by electroprecipitation or electrocoagulation). In various embodiments, one or more contaminants are oxidized by a chlorine atom produced by a photoelectrode. In various embodiments, one or more contaminants are altered electrochemically (e.g. by electroprecipitation or electrocoagulation).

While FIGS. 1 and 2 illustrate one or more examples of embodiments of a PECO device, it should be appreciated that certain components from the PECO device may be integrated into a PECO system. For example, a PECO system may include a plurality of plate pairs provided within a housing. A plate pair may include at least a photoanode or photoelectrode or photocatalytic anode 10 and a cathode or counterelectrode 14 to form an electrolytic cell. The plate pair may also include a light source assembly 22. The light source assembly 22 may illuminate photoelectrode 10 with UV light to make the surface of the photoelectrode 10 highly oxidative. Each plate pair may also have a power source or supply coupled thereto for providing a potential or bias across the photoelectrode 10 and counterelectrode 14. Application of a potential or bias to the photoelectrode provides further control over the oxidation process.

The plurality of plate pairs may be provided in the PECO system for the treatment of one or more aqueous solutions to reduce contaminants. An example of a PECO system having a plurality of plate pairs includes, but is not limited to, the system disclosed in U.S. Pat. No. 8,398,828 to Winkie et al., entitled "Apparatus and Method for Treating Aqueous Solutions and Contaminants Therein," the content of which is incorporated by reference in its entirety. In addition, it should be appreciated in one or more examples of embodiments, the plurality of plate pairs may be provided in parallel, may be provided in series, or may be provided in a combination of series and parallel arrangement within a PECO system.

In addition, the PECO system may distribute electricity to the plate pairs through a plurality of channels. A channel may be an electrical pathway for providing electricity to a single plate pair, or to a group or plurality of plate pairs. Accordingly, at least one plate pair may be associated with a channel; however in one or more examples of embodiments, a plurality of plate pairs may be associated with a channel.

Each channel provided in the PECO system may be electrically isolated from the other channels of the PECO system. This allows for the plate pair or plurality of plate pairs associated with the channel to be electrically isolated from the plate pair(s) associated with the other channels.

The PECO system may also include a circuit, a switch, a controller, a switcher board, a programmable logic controller (PLC), computer based controller, or other suitable controller or device for reversing the potential, bias, polarity and/or current applied to, between, or across the photoelectrode and counterelectrode of each plate pair associated with each channel. For various applications, including, for example hydraulic fracturing fluid or high-salinity applications, it may be desirable to reverse the potential, bias, polarity and/or current applied to or between the photoelectrode and the counterelectrode in order to clean or unfoul or remove fouling from the photoelectrode and/or counterelectrode, or to otherwise improve the performance of the photoelectrode, counterelectrode, or PECO device and/or PECO system. By reversing the potential, bias, polarity and/or current, the photoelectrode is changed from an anode into a cathode, and the counterelectrode is changed from a cathode into an anode. The reversing of potential, bias, polarity and/or current may be performed periodically, intermittently, or based upon a predetermined schedule.

For example, initially positive voltage is electrically connected to a positive charge electrode and negative voltage is electrically connected to a negative charge electrode. After PECO operation for a first period of time, positive voltage is electrically connected to the negative charge electrode, and negative voltage is electrically connected to the positive charge electrode for a second period of time. After the second period of time, the positive voltage is electrically connected back to the positive charge electrode and the negative voltage is electrically connected back to the negative charge electrode. This reversal process may be repeated as necessary or desired.

The length of the first period of time and the second period of time may be the same. In the alternative, in one or more examples of embodiments, the length of the first period of time and the second period of time are different. For example, the first period of time, which is the time associated with normal operation of the PECO system or device, is typically longer than the second period of time, which is the amount of time associated with polarity reversal operation of the PECO system or device.

The length of the first and second periods of time depends on a variety of factors including, but not limited to, the type of aqueous solution being treated, the contaminants within the aqueous solution, the salinity of the aqueous solution, application of the PECO system, and/or the voltage applied to the plate pairs through the channels. For example, hydraulic fracturing fluid or high salinity fluid applications may require relatively more frequent reversal of potential, bias, polarity and/or current compared to fresh water applications. In one or more examples of embodiments, the lengths of the first period of time relative to the second period of time may preferably be in a ratio range of about 1:1 to 25:1, and more preferably may be in a ratio range of about 1:1 to 7:1. For example, in one or more examples of embodiments, the first period of time may be approximately 120 seconds, while the second period of time may be approximately 20 seconds. Fresh water applications may require relatively less frequent reversal of potential, bias, polarity and/or current, and the lengths of the first period of time relative to the second period of time may be in a ratio range of about 100:1 to 10:1. For example, in various embodiments, the first period of time may be approximately 60 minutes, while the second period of time may be in a range of about 1 minute to about 5 minutes.

In one or more examples of embodiments, the voltage applied between the photoelectrode and counterelectrode may not change during the first period of time of normal potential and during the second period of time of reverse potential. For example, where the photoelectrode includes titanium and the apparatus and/or method are adapted for treatment of hydraulic fracturing or other high salinity aqueous solutions, the voltage applied during the first period of time may be less than about 9V, and more specifically may be about 7.5V, and the voltage applied during the second period of time may be less than about 9V, and more specifically may be about 7.5V. In one or more other examples of embodiments, for example where the photoelectrode includes titanium and the apparatus and/or method are adapted for treatment of fresh water, the voltage applied during the first period of time may be greater than about 9V, and more specifically may be about 12V, and the voltage applied during the second period of time may be greater than about 9V, and more specifically may be about 12V.

Maintaining the voltage in the first period of time and the second period of time may help to unfoul or defoul or remove fouling from the photoelectrode to help make the photoelectrode more effective for removing contaminants through photoelectrocatalytic oxidation during the first period of time. However, maintaining the voltage under 9V in each period of time may cause a momentary disturbance in the removal of contaminants during the second period of time. Thus, it may be advantageous in certain applications to apply higher voltages, for example a voltage greater than about 9V, during the first period of time and second period of time. This may assist in minimizing any such disturbance in the removal of contaminants and/or to help cause electroprecipitation and/or electrocoagulation.

The voltage may be adjusted to control the rate of dissolution of the electrode. For example, the voltage applied during the first period of time may be more than about 9V, and more specifically may be about 12V, and the voltage applied during the second period of time may be more than about 9V, and more specifically may be about 12V. Higher voltages may help optimize the effectiveness of the PECO device in certain ways. Higher voltages may also lead to electroprecipitation or electrocoagulation of contaminants within or from the fluid. However, such higher voltages may also lead to anodic dissolution such as pitting and other degradation of the photoelectrode and/or counterelectrode, which may necessitate more frequent servicing of the PECO device, including, but not limited to, replacement of the photoelectrode, the foil, and/or the counterelectrode.

In one or more examples of embodiments, it may be advantageous to apply different voltages during the first time period than the second time period. For example, it may be advantageous to apply relatively lower voltages during the first period of time, and relatively higher voltages during the second period of time. This may assist in limiting any anodic dissolution, or pitting, or other degradation of the photoelectrode. For example, the voltage applied during the first period of time may be less than about 9V, and more specifically may be about 7.5V. The voltage applied during the second period of time may be more than about 9V, and more specifically may be in a range of about 12V to about 14V. For example, for hydraulic fracturing fluid or higher salinity applications, the voltage during the second time period may be about 12V, while for fresh water applications, the voltage during the second time period may be about 14V. In one or more examples of embodiments, during application of relatively lower voltage during the first period of time, contaminants are degraded, or the removal of contaminants is promoted, by photoelectrocatalytic oxidation, and during application of a relatively higher voltage during the second period of time, contaminants are degraded, or the removal of contaminants is promoted, by an electrochemical process such as electroprecipitation and/or electrocoagulation.

In one or more examples of embodiments, during the second period of time, the counterelectrode or sacrificial electrode of titanium may be dissolved at least in part by anodic dissolution. It is believed that a range of coagulant species of hydroxides are formed, for example by electrolytic oxidation of the sacrificial counterelectrode, which hydroxides help destabilize and coagulate the suspended particles or precipitate and/or adsorb dissolved contaminants.

In various embodiments, the main reaction occurring at the counterelectrodes or sacrificial electrodes during the second period of time of polarity reversal is dissolution:

$$Ti_{(s)} \rightarrow Ti^{4+} + 4e^-$$

In addition, water is electrolyzed at the counterelectrode (or sacrificial electrode) and photoelectrode:

$$2H_2O + 2e^- \rightarrow H_{2(g)} + 2OH^- \quad \text{(cathodic reaction)}$$

$$2H_2O \rightarrow 4H^+ + O_{2(g)} + 4e^- \quad \text{(anodic reaction)}$$

In various embodiments, electrochemical reduction of metal cations ($Me^{n+}$) occurs at the photoelectrode surface:

$$Me^{n+} + ne^- \rightarrow nMe^o$$

Higher oxidized metal compounds (e.g., Cr(VI)) may also be reduced (e.g. to Cr(III)) about the photoelectrode:

$$Cr_2O_7^{2-} + 6e^- + 7H_2O \rightarrow 2Cr^{3+} + 14OH^-$$

In various embodiments, hydroxide ions formed at the photoelectrode increase the pH of the solution which induces precipitation of metal ions as corresponding hydroxides and co-precipitation with metal (e.g. Ti) hydroxides:

$$Me^{n+} + nOH^- \rightarrow Me(OH)_{n(s)}$$

In addition, anodic metal ions and hydroxide ions generated react in the solution to form various hydroxides and built up polymers:

$$Ti^{4+} + 4OH^- \rightarrow Ti(OH)_{4(s)}$$

$$nTi(OH)_{4(s)}^- \rightarrow Ti_n(OH)_{4n(s)}$$

However, depending on the pH of the solution other ionic species may also be present. The suspended titanium hydroxides can help remove pollutants from the solution by sorption, co-precipitation or electrostatic attraction, and coagulation. For a particular electrical current flow in an electrolytic cell, the mass of metal (e.g. Ti) theoretically dissolved from the counterelectrode or sacrificial electrode is quantified by Faraday's law.

$$m = \frac{ItM}{zF}$$

where m is the amount of counterelectrode or sacrificial electrode material dissolved (g), I the current (A), t the electrolysis time (s), M the specific molecular weight (g mol$^{-1}$), z the number of electrons involved in the reaction and F is the Faraday's constant (96485.34 As mol$^{-1}$). The mass of evolved hydrogen and formed hydroxyl ions may also be calculated.

In one or more examples of embodiments, it may be advantageous to apply relatively higher voltages during the first period of time, and relatively lower voltages during the second period of time. This may assist in limiting any anodic dissolution, or pitting, or other degradation of the photoelectrode. For example, the voltage applied during the first period of time may in a range of about 6V to 12V, and more specifically may be about 7.5V. The voltage applied during the second period of time may be in a range of about 0.6V to 12V. For example, during application of relatively higher voltage during the first period of time, contaminants are degraded, or the removal of contaminants is promoted, by photoelectrocatalytic oxidation, and during application of a relatively lower voltage during the second period of time, contaminants are degraded, or the removal of contaminants is promoted, by and electrochemical process such electroprecipitation or electrocoagulation.

In various embodiments, during the second period of time, an aluminum counterelectrode or sacrificial electrode is dissolved at least in part by anodic dissolution. It is believed that a range of coagulant species of hydroxides are formed (e.g., by electrolytic oxidation of the sacrificial counterelectrode), which hydroxides help destabilize and coagulate the suspended particles or precipitate and/or adsorb dissolved contaminants.

In various embodiments, the main reaction occurring at the counterelectrodes or sacrificial electrodes during the second period of time (e.g., during polarity reversal) is dissolution:

$$Al_{(s)} \rightarrow Al^{3+} + 3e^-$$

Additionally, water is electrolyzed at the counterelectrode (or sacrificial electrode) and photoelectrode:

$$2H_2O + 2e^- \rightarrow H_{2(g)} + 2OH^- \quad \text{(cathodic reaction)}$$

$$2H_2O \rightarrow 4H^+ + O_{2(g)} + 4e^- \quad \text{(anodic reaction)}$$

In various embodiments, electrochemical reduction of metal cations ($Me^{n+}$) occurs at the photoelectrode surface:

$$Me^{n+} + ne^- \rightarrow nMe^o$$

Higher oxidized metal compounds (e.g., Cr(VI)) may also be reduced (e.g. to Cr(III)) about the photoelectrode:

$$Cr_2O_7^{2-} + 6e^- + 7H_2O \rightarrow 2Cr^{3+} + 14OH^-$$

In various embodiments, hydroxide ions formed at the photoelectrode increase the pH of the solution which induces precipitation of metal ions as corresponding hydroxides and co-precipitation with metal (e.g., Al) hydroxides:

$$Me^{n+} + nOH^- \rightarrow Me(OH)_{n(s)}$$

In addition, anodic metal ions and hydroxide ions generated react in the solution to form various hydroxides and built up polymers:

$$Al^{3+} + 3OH^- \rightarrow Al(OH)_{3(s)}$$

$$nAl(OH)_{3(s)}^- \rightarrow Al_n(OH)_{3n(s)}$$

However, depending on the pH of the solution other ionic species, such as dissolved $Al(OH)^{2+}$, $Al_2(OH)_2^{4+}$ and $Al(OH)_4^-$ hydroxo complexes may also be present. The suspended aluminum hydroxides can help remove pollutants from the solution by sorption, co-precipitation or electrostatic attraction, and coagulation.

For a particular electrical current flow in an electrolytic cell, the mass of metal (e.g. Al) theoretically dissolved from the counterelectrode or sacrificial electrode is quantified by Faraday's law.

$$m = \frac{ItM}{zF}$$

where m is the amount of counterelectrode or sacrificial electrode material dissolved (g), I the current (A), t the electrolysis time (s), M the specific molecular weight (g mol$^{-1}$), z the number of electrons involved in the reaction and F is the Faraday's constant (96485.34 As mol$^{-1}$). The mass of evolved hydrogen and formed hydroxyl ions may also be calculated.

The foregoing presents one or more examples of embodiments of a PECO device and/or system. PECO system may include one or more embodiments of a polarity reversal system or program or application 200, 300. Polarity reversal program 200, 300 may be provided on a machine-readable or computer-readable medium or electronically readable storage medium which is in operable communication with the PECO system. Polarity reversal program 200, 300 may be prepared or written in any suitable programming language which enables communication with and/or control of certain elements of the PECO system as described herein. The steps recited in association with polarity reversal program 200, 300 may reside or be stored as one or more instructions or program parameters which may be executable by polarity reversal program 200, 300 and/or the PECO system. In one or more examples of embodiments, the electronically readable storage medium may include any data storage device which can store data that can be thereafter read by an electronic or computer system. Examples of electronically readable storage medium may include, but is not limited to, a computer hard drive, non-volatile memory, read-only memory, CD-ROM, CD-R, CD-RW, DVD, DVD-RW, magnetic tapes, Universal Serial Bus (USB) flash drive, or any other suitable data storage device.

Figure 3:
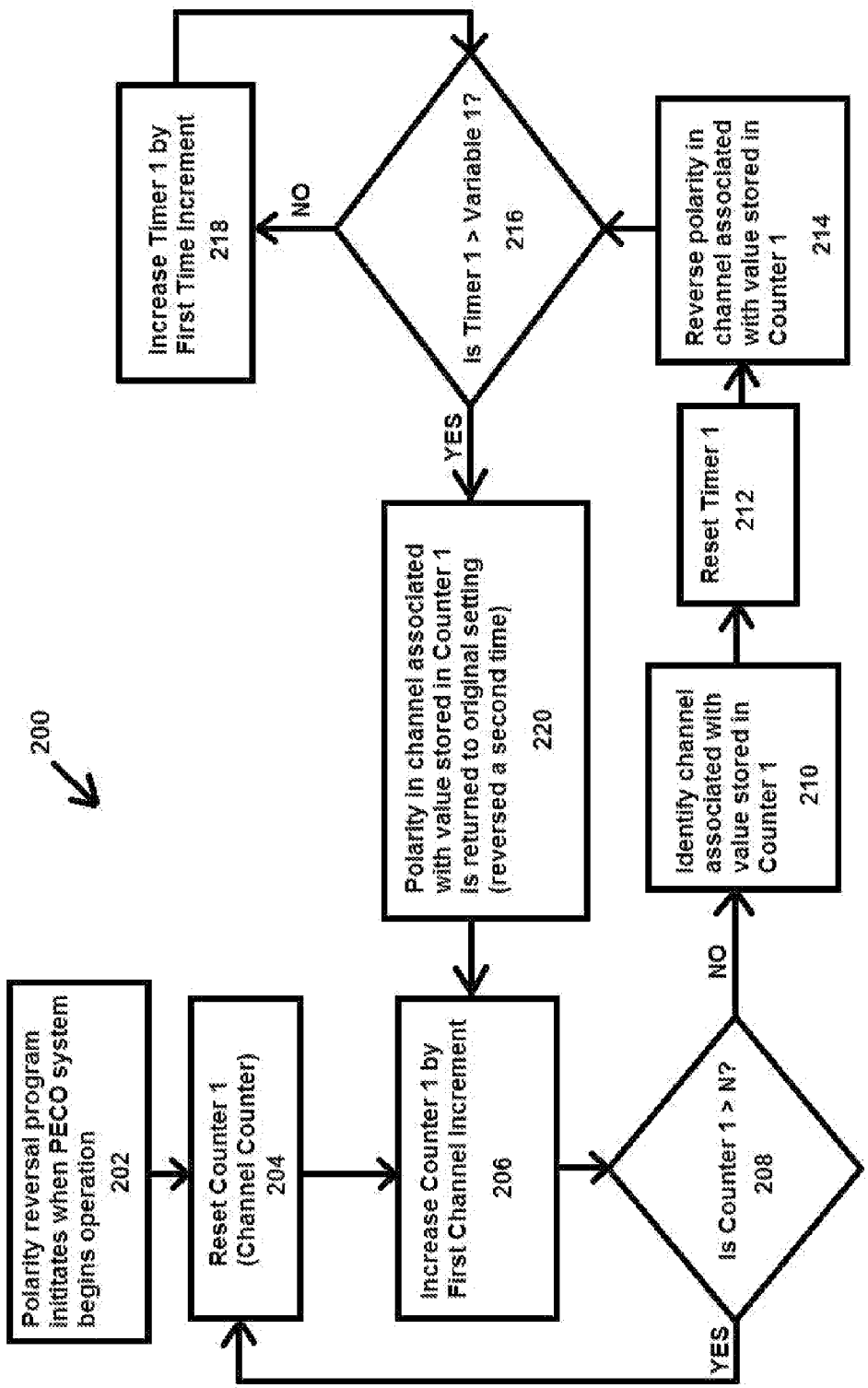
FIG. 3 is a flow diagram of a first example of an embodiment of a polarity reversal program adapted for removing fouling from components of a PECO assembly.
Figure 4:
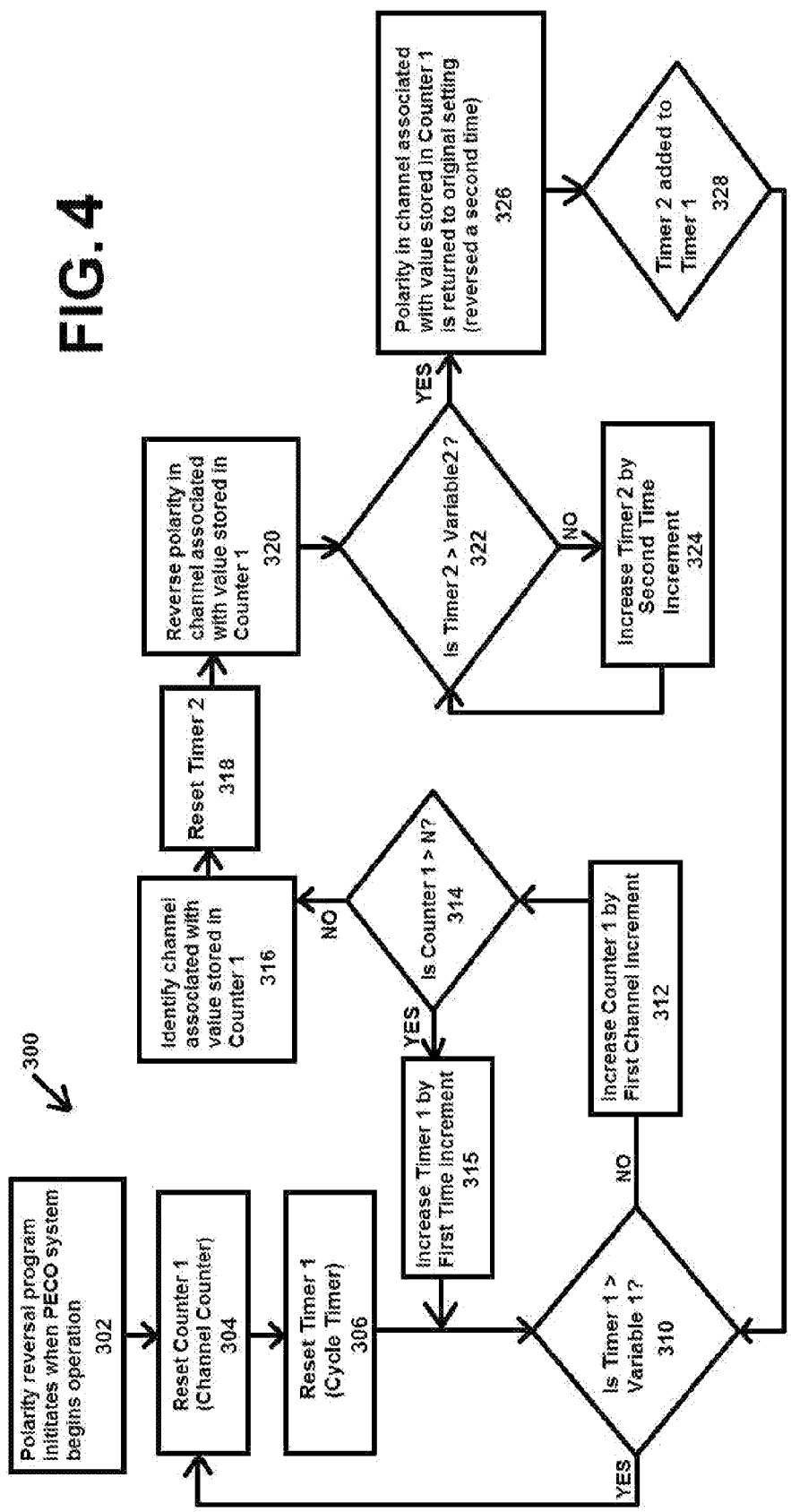
FIG. 4 is a flow diagram of a second example of an embodiment of a polarity reversal program adapted for removing fouling from components of a PECO assembly.

Referring to FIGS. 3 and 4, the respective polarity reversal program 200, 300 includes a series of steps or processing instructions which are depicted in flow chart or flow diagram form. Polarity reversal program 200, 300 may be implemented on a controller in association with the PECO system, for example, but not limited to, a programmable logic controller.

Referring now to FIG. 3, polarity reversal program 200 is provided. At step 202, operation of polarity reversal program 200 initiates in association with initiation of operation of the PECO system. During initiation of the PECO system, each of the plate pairs will begin operating in their respective normal manner with normal electrical current bias or polarity. For example, the plate pairs will operate in accordance with the present disclosure.

Next at step 204, a counter, Counter 1 or first counter, may be reset to an initial value. Counter 1 represents a counter for identifying each channel within polarity reversal program 200. More specifically, the plate pairs of the PECO system may be divided into a number of channels, N. Each channel may be associated with a single plate pair, or a plurality of plate pairs. Each channel also provides power to the associated plate pair or plurality of plate pairs for the associated polarity or bias. The PECO system may have N number of channels, where N is a preprogrammed integer or constant corresponding to the total number of channels provided in the PECO system. Counter 1 may be used to systematically progress through each of the channels of the PECO system, as each channel will have a preprogrammed assigned number (i.e. the first channel will be identified as Channel 1, the second channel will be identified as Channel 2, up to the Nth channel which will be identified as Channel N). As illustrated in FIG. 3, Counter 1 may be a "count-up" counter. Accordingly, Counter 1 may be reset to zero at step 204. In one or more examples of embodiments, Counter 1 may be a "count-down" counter which is reset to the preprogrammed number of channels N at step 204. In one or more examples of embodiments, preprogrammed integer or constant N may be greater than the number of channels actually provided in the PECO system. In such an arrangement, the additional channels provided in the constant N are treated as phantom or virtual channels. This allows program 200 to operate a cycle while all of the channels with one or more plate pairs associated therewith operate normally, or with polarity in a standard, non-reversed position.

At step 206, the channel number stored or held in Counter 1 may be increased or incremented by a first channel increment or value. A desired or predetermined first channel increment may be the integer "one," or any other unit which may be used to correspond to the preprogrammed channels. When increased or incremented, the new value is stored in Counter 1. In one or more examples of embodiments, Counter 1 may be decreased or decremented by a desired first channel increment in association with a "count-down" counter.

Next, at step 208, program 200 determines if the current channel number stored in Counter 1, and which was previously adjusted at step 206, is greater than the preset or preprogrammed number of channels N provided in the PECO System. This determination ascertains whether program 200 has cycled through all of the channels.

If the determination at step 208 is "no," the current channel number stored in Counter 1 is not greater than N, program 200 moves to step 210 to identify the channel which corresponds to the value stored in Counter 1.

At step 210, program 200 identifies the channel which corresponds to the value presently stored in Counter 1. As indicated, each channel of the PECO system will be pre-assigned an identifier, such as a number. The identifiers are preferably integers and spaced to correspond with the first channel increment. For example, if a PECO system has six channels, each channel may be assigned a respective, individual identifier corresponding to 1 though 6, with the first channel increment being "1." Program 200 will be able to determine which channel is associated with each associated identifier. It should be appreciated that the number of identifiers needed for the channels will correspond with N number of channels.

At step 212, a first timer, Timer 1, may be reset to an initial time period value. Timer 1 represents the reverse polarity timer for a channel. More specifically, Timer 1 may represent the measured length of time in which a channel operates with polarity reversed. Timer 1 may be used to ensure a preset or predetermined amount of time passes in which the channel operates with polarity reversed. As illustrated in FIG. 3, Timer 1 may be a "count-up" timer. Accordingly, Timer 1 may be reset to zero at step 212. In one or more examples of embodiments, Timer 1 may be a "count-down" timer which is reset to a predetermined amount of time at step 212.

At step 214, the polarity or current applied to the channel identified in step 210 and associated with the value stored in Counter 1 is reversed. As such, the anode/photoanode of the plate pair or plurality of plate pairs of the channel acts a cathode, and the cathode/counterelectrode of the plate pair or plurality of plate pairs of the channel acts as an anode. During this period of reversed polarity, the plate pair or plurality of plate pairs of the channel advantageously has fouling or scale removed or released.

At step 216, program 200 determines if the current time period value stored in Timer 1 is greater than a first predetermined time period or first time period, Variable 1 or "R." The first predetermined time period stored in Variable 1 or R is a predetermined or preprogrammed amount of time in which the plate pairs should operate with polarity reversed. It should be appreciated that Variable 1 or R may be a preset amount of time or a predetermined amount of time. In addition, the amount of time preset, entered, and/or stored as Variable 1 or R may be entered by the manufacturer or by a user. In one or more examples of embodiments, program 200 determines if Timer 1 is less than zero in association with a "count-down" timer.

If the determination at step 216 is "no," the current time period value stored in Timer 1 is not greater than Variable 1, program 200 moves to step 218.

At step 218, the current time period stored or held in Timer 1 may be increased or incremented by a desired first time increment. A desired first time increment may be one second, thirty seconds, one minute, or any desired amount of second and/or minutes. In one or more examples of embodiments, Timer 1 may be decreased or decremented by a desired first time increment in association with a "count-down" timer. Program 200 will then return to and repeat step 216. Steps 216 and 218 subsequently repeat until the determination at step 216 is "yes."

If the determination at step 216 is "yes," the current time value stored in Timer 1 is greater than Variable 1, program 200 moves to step 220. In one or more examples of embodiments in association with a "count-down" timer, the "no" determination at Step 216 occurs when Timer 1 is greater than zero, while the "yes" determination occurs when Timer 1 is not greater than zero.

At step 220, program 200 terminates the period of reversed polarity for the channel identified in step 210. As such, program 200 effectively reverses the polarity or bias a second time. The anode/photoanode of the plate pair or plurality of plate pairs of the channel returns to operate as an anode/photoanode, and the cathode/counterelectrode of the plate pair or plurality of plate pairs of the channel returns to operate as a cathode/counterelectrode.

Program 200 then returns to Step 206, and the process repeats, with the value stored in Counter 1 increasing or incrementing by the first channel increment. Steps 206 to 220 shall repeat until the determination at step 208 is "yes," the current channel number stored in Counter 1 is greater than N, the preprogrammed integer corresponding to the total number of channels in the PECO system.

Once Counter 1 is greater than N, this means the polarity of all channels has been systematically reversed, and the entire process of switching polarity in each channel should be repeated. As such, program 200 will move back to step 204, resetting Counter 1, and the steps 204 to 220 will repeat in accordance with the disclosure provided herein. Program 200 will continue to systematically execute steps 204 to 220 in accordance with the disclosure herein to systematically reverse the polarity of the channels until the PECO system is deactivated or program 200 is terminated.

To further illustrate operation and use of program 200, the following provides an example of certain operational scenarios using certain system conditions. The scenarios and associated system conditions are provided as an example, and should not be construed as limiting in any way. Any number or combination of system conditions may be realized in association with a PECO system and associated program 200.

As an example of operation of program 200, the system may have the following hypothetical system conditions: all timers will be "count-up" timers, the counter initial value will be zero (0), the first channel increment will be one (1), the number of channels of PECO system N will be six (6), the initial time period value of Timer 1 will be zero (0), Variable 1 will be twenty (20) seconds, and the first time increment will be one (1) second.

At step 202, Polarity reversal program 200 will initiate in association with operation of the PECO system. Next, at step 204, Counter 1 or first counter will be reset to zero, the counter initial value. At step 206, Counter 1 will be increased by the first channel increment. Accordingly, Counter 1 will be increased to one (1).

Next, at step 208, program 200 will determine if Counter 1 is greater than six (6), the number of preset channels of PECO system stored in "N." Since the answer will be no, program 200 will proceed to step 210. At step 210, the channel associated with the value stored in Counter 1 will be identified. Since Counter 1 has the number one (1) stored in it, program 200 will identify "Channel 1." Next, at step 212, Timer 1 or the first timer will be reset to the initial time period value of zero. At step 214, the polarity will be reversed in the plate pair or plurality of plate pairs associated with "Channel 1."

Next, at step 216, program 200 will determine if the value in Timer 1 is greater than Variable 1, which is twenty (20) seconds. Since Timer 1 is zero (0), Timer 1 is not greater than Variable 1, and program 200 moves to step 218.

At step 218, Timer 1 is increased by the first time increment, which is one (1) second. Program 200 will then return to step 216. Steps 216 and 218 repeat until the value stored in Timer 1 is greater than Variable 1, meaning Timer 1 is greater than twenty (20) seconds.

Once Timer 1 is greater than twenty (20) seconds, program 200 moves to step 220 where the polarity provided to the plate pair or plurality of plate pairs associated with "Channel 1" is reversed back to the original polarity. Program 200 will then move to step 206.

At step 206, Counter 1 will again be increased by increased by the first channel increment. Accordingly, Counter 1 will now be increased to two (2).

Next, at step 208, program 200 will determine if Counter 1 is greater than six (6), the number of preset channels of PECO system stored in "N." Since the answer will be no, program 200 will proceed to step 210. At step 210, the channel associated with the value stored in Counter 1 will be identified. Since Counter 1 now has the number two (2) stored in it, program 200 will identify "Channel 2." Next, at step 212, Timer 1 or the first timer will be reset to the initial time period value of zero. At step 214, the polarity will be reversed in the plate pair or plurality of plate pairs associated with "Channel 2." Next, steps 216 and 218 will repeat until Timer 1 exceeds Variable 1, meaning Timer 1 is greater than twenty (20) seconds.

Once Timer 1 is greater than twenty (20) seconds, program 200 moves to step 220 where the polarity provided to the plate pair or plurality of plate pairs associated with "Channel 2" is reversed back to the original polarity. Program 200 will then move to step 206.

This process will repeat until Counter 1 is greater than the number of preset channels of PECO system stored in "N." Accordingly, this process will repeat for all six (6) of the channels associated with the PECO system. Once Counter 1 reaches seven at step 206, program 200 will determine that Counter 1 does exceed the number of preset channels of PECO system stored in "N" at step 208. Program 200 will then move back to step 204, Counter 1 will be reset to zero, the counter initial value, and the entire process will repeat. This will systematically provide for the reversal of polarity for each channel associated with the PECO system.

Referring now to FIG. 4, polarity reversal program 300 is provided. At step 302, operation of polarity reversal program 300 initiates in association with initiation of operation of the PECO system. During initiation of the PECO system, each of the plate pairs will begin operating in their respective normal manner with normal electrical current bias or polarity. For example, the plate pairs will operate in accordance with the present disclosure.

Next at step 304, a counter, Counter 1 or first counter, may be reset to an initial value. Counter 1 represents a counter for identifying each channel within polarity reversal program 300. More specifically, the plate pairs of the PECO system may be divided into a number of channels, N. Each channel may be associated with a single plate pair, or a plurality of plate pairs. Each channel also provides power to the associated plate pair or plurality of plate pairs for the associated polarity or bias. The PECO system may have N number of channels, where N is a preprogrammed integer or constant corresponding to the total number of channels provided in the PECO system. Counter 1 may be used to systematically progress through each of the channels of the PECO system, as each channel will have a preprogrammed assigned number (i.e. the first channel will be identified as Channel 1, the second channel will be identified as Channel 2, up to the Nth channel which will be identified as Channel N). As illustrated in FIG. 4, Counter 1 may be a "count-up" counter. Accordingly, Counter 1 may be reset to zero at step 304. In one or more examples of embodiments, Counter 1 may be a "count-down" counter which is reset to the preprogrammed number of channels N at step 304.

At step 306, a first timer, Timer 1, may be reset to an initial time period value. Timer 1 represents the timer measuring the total operational cycle or cycle timer of program 300. More specifically, Timer 1 represents the total measured length of time in which all of the channels provided in the PECO system have had an opportunity to operate with the polarity reversed. As illustrated in FIG. 4, Timer 1 may be a "count-up" timer. Accordingly, Timer 1 may be reset to zero at step 306. In one or more examples of embodiments, Timer 1 may be a "count-down" timer which is reset to a predetermined amount of time at step 306.

Next, at step 310, program 300 determines if the current time period for the cycle timer stored in Timer 1 is greater than a first predetermined cycle time period or first time period, Variable 1. The first predetermined cycle time period stored in Variable 1 may be a predetermined or preprogrammed amount of time, or may be a calculated amount of time. In either case, the first predetermined cycle time period stored in Variable 1 must be equal to, greater than, or not less than the predetermined or preprogrammed amount of time in which each channel should operate with polarity reversed (stored in Variable 2 or R) multiplied by the number of channels provided in the PECO assembly (stored in Variable N). Stated otherwise, the formula to calculate the minimum amount of time for the value of Variable 1 would be "R×N" or "Variable 2×N." In one or more examples of embodiments, program 300 determines if Timer 1 is less than zero in association with a "count-down" timer.

At step 312, the channel number stored or held in Counter 1 may be increased or incremented by a first channel increment or value. A desired or predetermined first channel increment may be the integer "one," or any other unit which may be used to correspond to the preprogrammed channels. When increased or incremented, the new value is stored in Counter 1. In one or more examples of embodiments, Counter 1 may be decreased or decremented by a desired first channel increment in association with a "count-down" counter.

Next, at step 314, program 300 determines if the channel number stored in Counter 1, and which was previously adjusted at step 312, is greater than the preset or preprogrammed number of channels N provided in the PECO System. This determination ascertains whether program 300 has cycled through all of the channels.

If the determination at step 314 is "no," the current channel number stored in Counter 1 is not greater than N, program 300 moves to step 316 to identify the channel which corresponds to the value stored in Counter 1.

At step 316, program 300 identifies the channel which corresponds to the value presently stored in Counter 1. As indicated, each channel of the PECO system will be pre-assigned an identifier, such as a number. The identifiers are preferably integers and spaced to correspond with the first channel increment. For example, if a PECO system has eight channels, each channel may be assigned a respective, individual identifier corresponding to 1 though 8, with the first channel increment being "1." Program 300 will be able to determine which channel is associated with each associated identifier. It should be appreciated that the number of identifiers needed for the channels will correspond with N number of channels. In addition, the individual identifiers may be randomly or strategically assigned to each channel as long as each channel only has one identifier.

At step 318, a second timer, Timer 2, may be reset to an initial time period value. Timer 2 represents the reverse polarity timer for a channel. More specifically, Timer 2 may represent the measured length of time in which a channel operates with polarity reversed. Timer 2 may be used to ensure a preset or predetermined amount of time passes in which the channel operates with polarity reversed. As illustrated in FIG. 4, Timer 2 may be a "count-up" timer. Accordingly, Timer 2 may be reset to zero at step 318. In one or more examples of embodiments, Timer 2 may be a "count-down" timer which is reset to a predetermined amount of time at step 318.

At step 320, the polarity or current applied to the channel identified in step 316 and associated with the value stored in Counter 1 is reversed. As such, the anode/photoanode of the plate pair or plurality of plate pairs of the channel acts a cathode, and the cathode/counterelectrode of the plate pair or plurality of plate pairs of the channel acts as an anode. During this period of reversed polarity, the plate pair or plurality of plate pairs of the channel advantageously has fouling or scale removed or released.

At step 322, program 300 determines if the current time period value stored in Timer 2 is greater than a second predetermined time period, Variable 2 or "R." The second predetermined time period stored in Variable 2 or R is a predetermined or preprogrammed amount of time in which the plate pairs should operate with polarity reversed. It should be appreciated that Variable 2 or R may be a preset amount of time or a predetermined amount of time. In addition, the amount of time preset, entered, and/or stored as Variable 2 or R may be entered by the manufacturer or by a user. In one or more examples of embodiments, program 300 determines if Timer 2 is less than zero in association with a "count-down" timer.

If the determination at step 322 is "no," the current time period value stored in Timer 2 is not greater than Variable 2, program 300 moves to step 324.

At step 324, the current time period stored or held in Timer 2 may be increased or incremented by a desired second time increment. A desired second time increment may be one second, thirty seconds, one minute, or any desired amount of second and/or minutes. In one or more examples of embodiments, Timer 2 may be decreased or decremented by a desired second time increment in association with a "count-down" timer. Program 300 will then return to and repeat step 322. Steps 322 and 324 subsequently repeat until the determination at step 322 is "yes."

If the determination at step 322 is "yes," the current time value stored in Timer 2 is greater than Variable 2, program 300 moves to step 326. In one or more examples of embodiments in association with a "count-down" timer, the "no" determination at Step 322 occurs when Timer 2 is greater than zero, while the "yes" determination occurs when Timer 2 is not greater than zero.

At step 326, program 300 terminates the period of reversed polarity for the channel identified in step 316. As such, program 300 effectively reverses the polarity or bias a second time. The anode/photoanode of the plate pair or plurality of plate pairs of the channel returns to operate as an anode/photoanode, and the cathode/counterelectrode of the plate pair or plurality of plate pairs of the channel returns to operate as a cathode/counterelectrode.

Next, at step 328 the value stored in Timer 2 may be added to the value stored in Timer 1. The combined value may be stored in Timer 1. It should be appreciated in one or more examples of embodiments, that step 328 is optional. In the alternative, following step 306, the cycle time timer, Timer 1, may operate in the background and concurrently as Steps 312 to 326 are being implemented. In such an arrangement, Timer 1 may be a count-up or a count-down timer which tracks the total cycle time of program 300 independently of Timer 2.

Program 300 then returns to Step 310, and steps 310 to 328 repeat until the determination at step 310 is "yes," value stored in Timer 1 is greater than the first predetermined cycle time period stored in Variable 1. Once Timer 1 is greater than Variable 1, this means the cycle time period has completed, and another cycle time period should be initiated. As such, program 300 will move back to step 304, resetting Counter 1 and Timer 1, and steps 310 to 328 will repeat in accordance with the disclosure provided herein. Program 300 will continue to systematically execute steps 304 to 328 in accordance with the disclosure herein to systematically reverse the polarity of the channels until the PECO system is deactivated or program 300 is terminated.

It should be appreciated in situations where the first predetermined cycle time period stored in Variable 1 exceeds the minimum amount of time for a cycle time, which is calculated through the formula "Variable 2×N." In this situation, when the Counter 1 is greater than N, the polarity of all channels of the PECO system has been systematically reversed. Program 300 will move from step 314 to step 315, where Timer 1 may be increased or incremented by a desired first time increment. A desired first time increment may be one second, thirty seconds, one minute, or any desired amount of second and/or minutes. In one or more examples of embodiments, Timer 1 may be decreased or decremented by a desired second time increment in association with a "count-down" timer. Program 300 will then move to step 310, cycling between steps 310, 312, 314, and 315 until the determination at step 310 is "yes."

To further illustrate operation and use of program 300, the following provides an example of certain operational scenarios using certain system conditions. The scenarios and associated system conditions are provided as an example, and should not be construed as limiting in any way. Any number or combination of system conditions may be realized in association with a PECO system and associated program 300.

As an example of operation of program 300, the system may have the following hypothetical system conditions: all timers will be "count-up" timers, the counter initial value will be zero (0), the cycle timer initial value will be zero (0), Variable 1 will one hundred eighty (180) seconds, the first channel increment will be one (1), the number of channels of PECO system N will be eight (8), the first time increment will be one (1) second, the initial time period value of Timer 2 will be zero (0), Variable 2 will be twenty (20) seconds, and the second time increment will be one (1) second.

At step 302, Polarity reversal program 300 will initiate in association with operation of the PECO system. Next, at step 304, Counter 1 or first counter or channel counter will be reset to zero, the counter initial value. At step 306, Timer 1 or the first timer will be reset to the initial time period value of zero. Next, at step 310 program 300 will determine if the value in Timer 1 is greater than Variable 1, which is one hundred eighty (180) seconds. Since Timer 1 is "zero," Timer 1 is not greater than Variable 1, and program 300 moves to step 312.

At step 312, Counter 1 will be increased by the first channel increment of one. Accordingly, Counter 1 will be increased to one (1). Next, at step 314, program 300 will determine if Counter 1 is greater than eight (8), the number of preset channels of PECO system stored in "N." Since the answer will be no, program 300 will proceed to step 316. At step 316, the channel associated with the value stored in Counter 1 will be identified. Since Counter 1 has the number one (1) stored in it, program 300 will identify "Channel 1." Next, at step 318, Timer 2 or the second timer will be reset to the initial time period value of zero. At step 320, the polarity will be reversed in the plate pair or plurality of plate pairs associated with "Channel 1."

Next, at step 322, program 300 will determine if the value in Timer 2 is greater than Variable 2, which is twenty (20) seconds. Since Timer 2 is "zero," Timer 2 is not greater than Variable 2, and program 300 moves to step 324.

At step 324, Timer 2 is increased by the second time increment, which is one (1) second. Program 300 will return to step 322. Steps 322 and 324 repeat until the value stored in Timer 2 is greater than Variable 2, meaning Timer 2 is greater than twenty (20) seconds.

Once Timer 2 is greater than twenty (20) seconds, program 300 moves to step 326 where the polarity provided to the plate pair or plurality of plate pairs associated with "Channel 1" is reversed back to the original polarity. Program 300 will then move to step 328. At step 328, the amount of time stored in Timer 2, which is twenty (20) seconds, is added to the amount of time stored in Timer 1, which is zero (0) seconds. This total is then stored in Timer 1. Accordingly, Timer 1 will now total twenty (20) seconds. Program 300 then returns to step 310.

At step 310, program 300 will determine if the value in Timer 1 is greater than Variable 1, which is one hundred eighty (180) seconds. Since Timer 1 is twenty (20) seconds, Timer 1 is not greater than Variable 1, and program 300 moves to step 312.

At step 312, Counter 1 will again be increased by increased by the first channel increment. Accordingly, Counter 1 will now be increased to two (2).

Next, at step 314, program 300 will determine if Counter 1 is greater than eight (8), the number of preset channels of PECO system stored in "N." Since the answer will be no (two is not greater than eight), program 300 will proceed to step 316. At step 316, the channel associated with the value stored in Counter 1 will be identified. Since Counter 1 now has the number two (2) stored in it, program 300 will identify "Channel 2." Next, at step 318, Timer 12 or the second timer will be reset to the initial time period value of zero (0). At step 320, the polarity will be reversed in the plate pair or plurality of plate pairs associated with "Channel 2." Next, steps 322 and 324 will repeat until Timer 2 exceeds Variable 2, meaning Timer 2 is greater than twenty (20) seconds.

Once Timer 2 is greater than twenty (20) seconds, program 300 moves to step 326 where the polarity provided to the plate pair or plurality of plate pairs associated with "Channel 2" is reversed back to the original polarity. Program 300 will then move to step 328. At step 328, the amount of time stored in Timer 2, which is twenty (20) seconds, is added to the amount of time stored in Timer 1, which is twenty (20) seconds. This total is then stored in Timer 1. Accordingly, Timer 1 will now total forty (40) seconds. Program 300 then returns to step 310.

This process will repeat until Counter 1 is greater than the number of preset channels of PECO system stored in "N." Accordingly, this process will repeat for all eight (8) of the channels associated with the PECO system. Once Counter 1 reaches nine at step 312, program 300 will determine that Counter 1 does exceed the number of preset channels of PECO system stored in "N" at step 314. Program 300 will then move to step 315, where Timer 1 will be increased by the first time increment of one (1) second. After completion of cycling though the eight (8) channels associated with the PECO system, the amount of time in Timer 1 will be one hundred sixty (160) seconds. Accordingly, one second will be added to Timer 1, and Steps 310, 312, 314, and 315 will repeat until Timer 1 exceeds Variable 1. Once Timer 1 exceeds variable 1, program 300 will move back to step 304, Counter 1 will be reset to zero, Timer 1 will be reset to zero, and the entire process will repeat. This will systematically provide for the reversal of polarity for each channel associated with the PECO system.

It should be appreciated that by rotating between channels, program 200, 300 advantageously reverses polarity in a portion of the plate pairs or plurality of plate pairs provided in the PECO system. As such, the remaining plate pair or plurality of plate pairs which are operating "normally" and continue to drive the PECO reaction, continuing to treat the aqueous solution. This provides for descaling or the removal of fouling from components of the plate pairs or plurality of plate pairs without substantially interrupting operation of the PECO system.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

Although various representative examples of embodiments of this invention have been described above with a certain degree of particularity, those skilled in the art could make numerous alterations to the disclosed embodiments without departing from the spirit or scope of the inventive subject matter set forth in the specification and claims. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Moreover, some portions of the detailed descriptions herein are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities. Unless specifically stated otherwise as apparent from the discussions herein, it is appreciated that throughout the present invention, discussions utilizing terms such as "receiving," "sending," "generating," "reading," "invoking," "selecting," and the like, refer to the action and processes of a computer system, or similar electronic computing device, including an embedded system, that manipulates and transforms data represented as physical (electronic) quantities within the computer system.

Although the present invention has been described with reference to particular embodiments, persons skilled in the art will recognize that changes may be made in form and detail without departing from the spirit and scope of the invention.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

What is claimed is:

1. A method for operating a photoelectrocatalytic oxidation assembly for removing fouling from components comprising:
    resetting a first counter;
    increasing the first counter by a first channel increment value;
    determining if the value in the first counter exceeds a value corresponding to the number of channels provided in the photoelectrocatalytic oxidation assembly;
    performing the following steps if the first counter does not exceed a value corresponding to the number of channels provided in the photoelectrocatalytic oxidation assembly:
        reversing polarity in a channel associated with the value in the first counter;
        resetting a first timer;
        determining if an amount of time in the first timer exceeds a first time period;
        increasing the amount of time remaining in the first timer by a first time increment if the amount of time remaining in the first timer does not exceed the first time period;
        terminating the polarity reversal in the channel associated with the value in the first counter when the time remaining in the first timer exceeds the first time period;
        returning to the step of increasing the first counter by the first channel increment value; and
    returning, if the value in the first counter exceeds a value corresponding to the number of channels provided in the photoelectrocatalytic oxidation assembly, to the step of resetting the first counter.

2. The method of claim 1, wherein the first channel increment value is preset.

3. The method of claim 1, wherein the first channel increment value is the integer one.

4. The method of claim 1, wherein the value corresponding to the number of channels provided in the photoelectrocatalytic oxidation assembly is preset.

5. The method of claim 1, wherein the value corresponding to the number of channels provided in the photoelectrocatalytic oxidation assembly is greater than one.

6. The method of claim 1, wherein at least one plate pair having an anode and a cathode is associated with each channel provided in the photoelectrocatalytic oxidation assembly.

7. The method of claim 1, wherein the value corresponding to the first time period is less than five minutes.

8. The method of claim 1, wherein the value corresponding to the first time period is less than one minute.

9. The method of claim 1, wherein the value corresponding to the first time period is not greater than twenty seconds.

10. The method of claim 1, wherein the first time increment equals one second.

11. A method for removing scale from a plurality of photoelectrodes associated with a photoelectrocatalytic oxidation assembly thru polarity reversal, the plurality of photoelectrodes being associated with a plurality of channels, such that at least one photoelectrode is associated with each channel, comprising:
    resetting a first counter and a first timer;
    determining if an amount of time in the first timer exceeds a first time period;
    increasing the amount of time in the first timer by a first time increment;
    increasing the first counter by a first channel increment value;
    determining if the value in the first counter exceeds a value corresponding to the number of channels provided in the photoelectrocatalytic oxidation assembly;
    performing the following steps if the first counter does not exceed a value corresponding to the number of channels provided in the photoelectrocatalytic oxidation assembly:
        reversing polarity in a channel associated with the value in the first counter;
        resetting a second timer;
        determining if an amount of time in the second timer exceeds a second time period;
        increasing the amount of time remaining in the second timer by a second time increment if the amount of time remaining in the second timer does not exceed the second time period;
        terminating the polarity reversal in the channel associated with the value in the second counter when the time remaining in the second timer exceeds the second time period;
        returning to the step of determining if an amount of time in the first timer exceeds the first time period;
    returning, if the value in the first counter exceeds a value corresponding to the number of channels provided in the photoelectrocatalytic oxidation assembly and the amount of time in the first timer does not exceed the first time period, to the step of increasing the amount of time in the first timer by a first time increment; and
    returning, if the amount of time in the first timer does exceed the first time period, to the step of resetting the first counter and the first timer.

12. The method of claim 11, wherein the first time period is a cycle time period.

13. The method of claim 11, wherein the first time period is at least the number of channels multiplied by the second time period.

14. The method of claim 11, further comprising after the step of terminating the polarity reversal in the channel associated with the value in the second counter when the time remaining in the second timer exceeds the second time period, performing the step of combining the amount to time in the second timer with the amount of time in the first timer and storing the total in the first timer.

15. The method of claim 11, wherein the first channel increment value is the integer one.

16. The method of claim 11, wherein the value corresponding to the number of channels provided in the photoelectrocatalytic oxidation assembly is preset.

17. The method of claim 11, wherein the value corresponding to the number of channels provided in the photoelectrocatalytic oxidation assembly is greater than one.

18. The method of claim 11, wherein at least one plate pair having an anode and a cathode is associated with each channel provided in the photoelectrocatalytic oxidation assembly.

19. The method of claim 11, wherein the value corresponding to the second time period is less than one minute.

20. The method of claim 11, wherein the value corresponding to the second time period is not greater than twenty seconds.

* * * * *